United States Patent [19]
Dellert et al.

[11] Patent Number: 5,926,288
[45] Date of Patent: Jul. 20, 1999

[54] IMAGE HANDLING SYSTEM AND METHOD USING MUTUALLY REMOTE PROCESSOR-SCANNER STATIONS

[75] Inventors: David William Dellert, Fairport; Carl Joseph Tesavis, Spencerport, both of N.Y.

[73] Assignee: Eastman Kodak Company, Rochester, N.Y.

[21] Appl. No.: 08/710,274

[22] Filed: Sep. 16, 1996

[51] Int. Cl.⁶ ...................................................... H04N 1/04
[52] U.S. Cl. ........................................... 358/487; 358/408
[58] Field of Search .................................. 358/400, 401, 358/405, 406, 434, 435, 438, 440, 444, 468, 487, 408, 407, 436; 379/100.06, 100.09, 102.02; 395/114, 115

[56] References Cited

U.S. PATENT DOCUMENTS

| | | | |
|---|---|---|---|
| 5,179,651 | 1/1993 | Taaffe et al. | 395/154 |
| 5,235,680 | 8/1993 | Bijnagte | 395/161 |
| 5,272,549 | 12/1993 | McDonald | 358/527 |
| 5,293,208 | 3/1994 | Okano et al. | 355/55 |
| 5,321,816 | 6/1994 | Rogan et al. | 395/200 |
| 5,327,265 | 7/1994 | McDonald | 358/444 |
| 5,383,027 | 1/1995 | Harvey | 358/296 |
| 5,428,747 | 6/1995 | Kitamoto | 395/275 |
| 5,469,353 | 11/1995 | Pinsky et al. | 364/413.01 |
| 5,477,353 | 12/1995 | Yamasaki | 358/487 |
| 5,493,408 | 2/1996 | Kurogane et al. | 358/296 |
| 5,502,576 | 3/1996 | Ramsay et al. | 358/444 |
| 5,528,492 | 6/1996 | Fukushima | 364/419.19 |

FOREIGN PATENT DOCUMENTS

| | | |
|---|---|---|
| 5-35802 | 2/1993 | Japan . |
| 5-158956 | 6/1993 | Japan . |
| 5-242165 | 9/1993 | Japan . |

OTHER PUBLICATIONS

Advertisement of Centillion Data System, Inc., from Editor & Publisher Magazine, May 27, 1995.
Article Entitled "Images on Compuserve: The "Best of Bettmann" Online" to O'Leary, vol. 19, No. 3, pp. 70–72, ISSN 0146–5422, May/ Jun., 1995.
Article Entitled "Getting the Picture" to Benson, vol. 10, No. 10, pp. 130–134, MacWorld, Oct., 1993.
Article Entitled "Moving Image Without Tears", vol. 12, No. 12, pp. 121–122, MacWorld, Dec. 1995.
Article Entitled "Imaging Technology in Libraries: Photo CD Offers New Possibilities" to Beiser, vol. 17, No. 6, pp. 16–29, Online, Nov. 1993.
"Picture Web Preview" Aug. 28, 1996 16 pages from http://www.pictureweb.com/ and http://www.pictureplace.com/.

*Primary Examiner*—Jerome Grant, II
*Attorney, Agent, or Firm*—James D. Leimbach

[57] ABSTRACT

An image handling system, and a method which can be executed on such a system comprising a plurality of processor-scanner stations remote from one another, interfaced with a hub station that is in turn interfaced with a plurality of terminal. Each processor-scanner station having at the same location: a processor which can process exposed photographic film to produce a hardcopy image set; a scanner system which can scan the hardcopy image set to obtain a corresponding image set signal; and a first communication interface for communicating the image set signal to a remote hub station. The hub station, which can be remote from each of the scanner stations, comprises: a second communication interface to receive image set signals from each of the plurality of scanner systems; a first storage to store the image set signals; a third communication interface for transmitting the image set signals to any of a plurality of terminals remote from the hub and each of the processor-scanner stations. A plurality of terminals that are remote from the hub station and each of the scanner-processor stations, and connected to communicate with the hub station.

8 Claims, 4 Drawing Sheets

IMAGE HANDLING SYSTEM AND METHOD USING MUTUALLY REMOTE PROCESSOR-SCANNER STATIONS

FIELD OF THE INVENTION

This invention relates generally to the field of photography and image signals obtained from photographs. More particularly, the present invention relates to a system and method by which image signals corresponding to hardcopy photographs, can be readily retrieved and distributed as desired by a user.

BACKGROUND OF THE INVENTION

In conventional photography, a user exposes a photographic film in a camera and conveys (either personally, by mail, or some other delivery service) the exposed film to any convenient processing center. The processing center then processes the film to form the hardcopy images (typically in the form of photographic negatives on the original film and/or photographic prints, or photographic positives in the case of reversal processed film). The hardcopy images are then conveyed back to the user (often by the user personally picking them up at the processing center). If a user desires to share the images with others without giving up their own hardcopies, they typically go through the highly tedious and time consuming effort of designating which hardcopy images are desired to be shared, returning the designated hardcopy images to the processor to produce further hardcopies, and conveying the further hardcopies to the person(s) with whom they wish to share. If later it is desired to share the images with other persons, the same process must typically be repeated.

In fact, so much effort and time is required that most users will simply not bother with multiple image sharing.

It has been appreciated that users can conveniently distribute multiple image copies in little time, by scanning the hardcopy image on a home scanner to generate corresponding digital image signals, and then forwarding one or more copies of the digital image signal to others by means of electronic mail (such as over the Internet). Furthermore, the recent advent of services such as KODAK PICTURE DISK available from Eastman Kodak Company and many processors, which allows a user to obtain a digital image signal of images of processed film on a disk for a modest price, even eliminates the need for the user to own a scanner. The availability of a digital image signal additionally allows a user to conveniently store, manipulate, and display or print copies of the images as desired at the user's location using conventional computer equipment.

U.S. Pat. No. 5,272,549 discloses a system in which a customer can connect his computer to a remote print or copy center to retrieve digital image signals of the customer's images. Those digital image signals are described as having been obtained on a scanner at the customer's location with the storage media then being shipped to the print or copy center, or obtained on a scanner at the remote print or copy center. Similarly, subsequent U.S. Pat. No. 5,477,353 describes a system in which one or more photographer units can connect to a centralized laboratory unit (containing a film processor, scanner, and printer). The '353 patent system is constructed with the purpose that a given user's films are processed and scanned at one central processing center, each assigned a unique identification code, and retrieved by that user at his remote terminal using the identification code. The retrieved images can then be manipulated by the user and printed at the central processing center.

The systems of the '549 or '353 patents require that all digital image storage media (in the '549 patent) or hardcopy film (in the case of the '353 patent) carrying images from multiple users, must be conveyed to only one central processing center. This is inconvenient and may cause delays in such a system implemented on a country wide basis. Even if the either patent contemplated multiple processing centers (which they do not), a user would still be required to remember which processing center his film was conveyed to, then use his remote terminal to communicate with that specific processing center to merely retrieve the user's digital images.

It would be desirable to provide a system which allows a user to simply have an exposed film delivered to any convenient one of a number of locations, at which locations the film is processed and scanned, and which allows a user to access the resulting image signals from a remote terminal without having to keep track of which films were delivered to which location. It would further be desirable that, in the event of failures in the system, a means is provided for assisting in determining the source of the failure. It would further be desirable that such a system allows a user to consistently obtain further desired services, such as forwarding copies of the images to others or obtaining products incorporating the images, without regard to the location at which the images were scanned and without having to make contact with further service providers offering such further services.

SUMMARY OF THE INVENTION

The present invention then, provides an image handling system comprising:

(a) a plurality of processor-scanner stations remote from one another, each scanner station having at the same location:
  a processor which can process exposed photographic film to produce a hardcopy image set;
  a scanner system which can scan the hardcopy image set to obtain a corresponding image set signal;
  a first communication means for communicating the image set signal to a remote hub station;

(b) a hub station remote from each of the scanner stations, comprising:
  a second communication means to receive image set signals from each of the plurality of scanner systems;
  a first storage to store the image set signals;
  a third communication means for transmitting the image set signals to any of a plurality of terminals remote from the hub and each of the processor-scanner stations; and (c) a plurality of terminals remote from the hub station and each of the scanner-processor stations, connected to communicate with the hub station.

The present invention further provides an image handling method comprising:
  processing exposed photographic film at each of a plurality of processor-scanner stations, each station having both a scanner and a processor at the same location and the processor-scanner stations being remote from one another, to produce a hardcopy image set at the processor-scanner locations;
  scanning each hardcopy image set at the same processor-scanner location at which it was processed, to obtain a corresponding image set signal;
  communicating each of the image set signals from the scanner to a hub station remote from each of the processor-scanner stations;

storing the communicated image set signals at the hub station; and transmitting the image set signals to any of a plurality of terminals remote from the hub station and each of the processor-scanner stations.

Additionally, the present invention provides a hub station with suitable means for executing each step required by a hub station of the present invention or as described below. Such means is preferably in the form of a digital computer suitably programmed to execute the required steps, or in the form of equivalent hardware, or a combination of both.

The present invention realizes that a system with multiple remote processor-scanner stations and a remote hub station, can conveniently allow a user to deliver an exposed film to any convenient one of multiple locations, while allowing ready retrieval of scanned images at any remote user terminal without the user tracking the location to which each exposed film was delivered. Further, the additional use of a unique identification signal associated with each scanner location facilitates a determination of the source of any failure in the system. In particular, the scanner location which was to communicate the images can be contacted to determine if the scanned images were in fact completely communicated to the hub station and if so, the particulars of such transmission, and to request a re-transmission if necessary. Additionally, the presence of a hub station allows a user to forward copies of the images or have other services for the images, consistently obtained from the same location without having to communicate with other vendors and without regard to the locations to which different films may have been delivered.

BRIEF DESCRIPTION OF THE DRAWINGS

To facilitate understanding, identical reference numerals have been used, where possible, to designate identical elements that are common to the figures.

EMBODIMENTS OF THE INVENTION

In the present invention it will be understood that with reference to components being "remote" from one another, is meant that they will be at least in another building, and often a mile or more (such as 10, 100 or even 1000 miles) apart. A reference to "communication" refers, unless a contrary indication is given, to transfer of a signal. Such transfer can occur, for example, as a transmission of a signal between the sender and receiver, such as may be obtained over a computer network such as the Internet, dedicated communication line, or over a direct dial-up connection such as provided by a telephone line (any of which may include satellite or other non-wired links, in addition to wired and fiber optic links). Thus, "transmission" implies a signal transfer without a physical transfer of a storage means, such as by suitable "connection" (that is, an actual electronic communication link including a direct connection, such as over a telephone or an indirect connection as may occur over the Inernet). In any event, due to the distances typically encountered between processor-scanner stations, hub station and terminals, there will typically be one or more signal repeaters between the originator of the communication and the receiver. Alternatively, the transfer can occur by the signal being saved on a suitable storage medium (such as magnetic or optical tape or disks) and the storage medium being physically transferred followed by the reading of the signal from the hardcopy at the receiver. A reference to "forwarded" refers, unless a contrary indication is given, to a transfer of both a signal (that is, a "communication") as well as to other means of transfer, such as the physical transfer of a hardcopy (for example, a suitable medium upon which data, such as alphanumeric characters, corresponding to a signal has been printed).

In the present invention reference is made to scanning of a hardcopy image to obtain a corresponding digital image. Such procedures and equipment for performing scanning, are well known. Typically, a film frame is scanned with a light beam, and the light transmitted through the film is detected, typically as three primary color light intensity signals, and digitized. The digitized values may be formatted to a standard for video display and stored on compact disc. magnetic media, or other suitable storage. Such image digitizers take a variety of forms and the various common aspects of film digitizing, particularly line illumination and linear CCD-based digitizers, are described in greater detail in U.S. Pat. No. 5,012,346. Also photographic prints can be digitized using reflection scanners.

Figure 1:
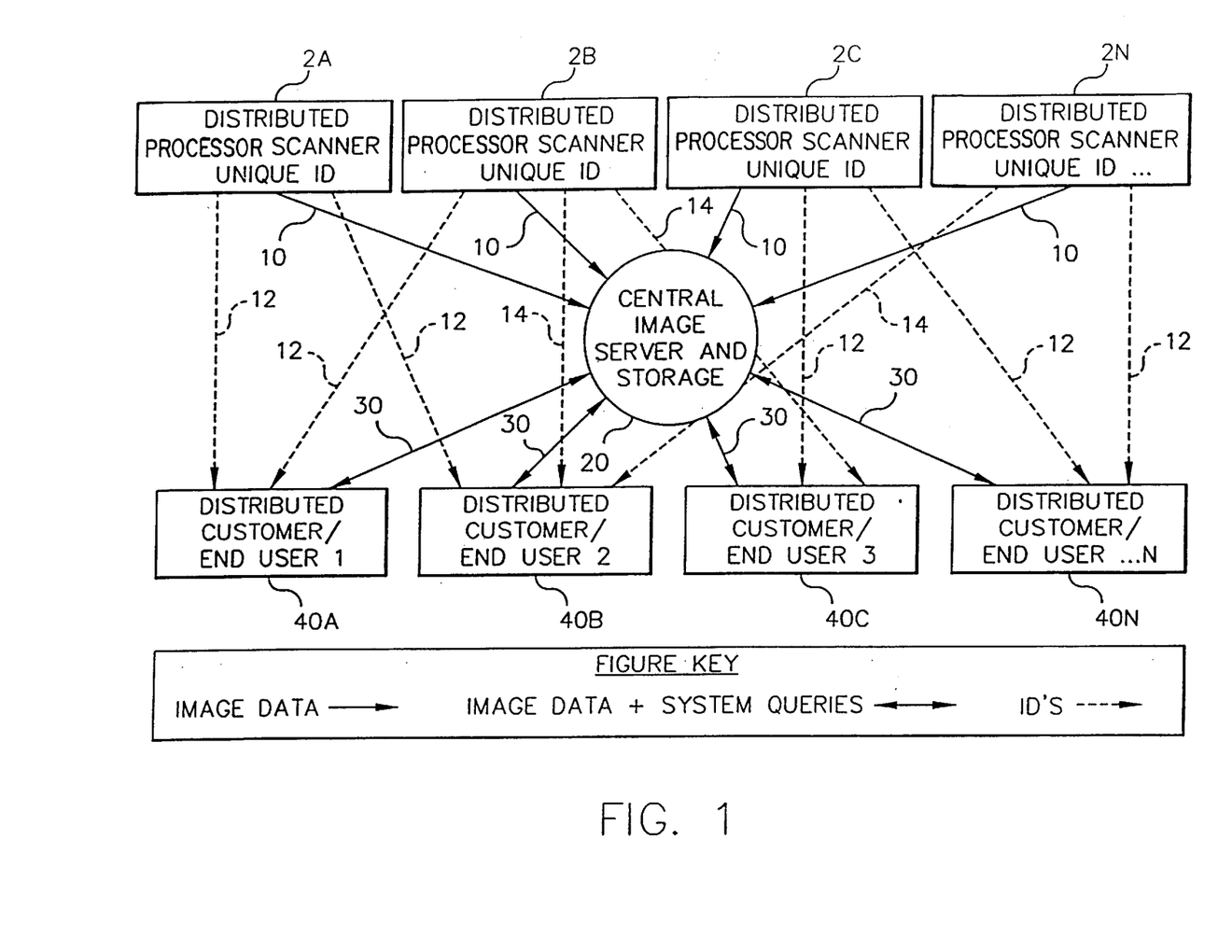
FIG. 1 is block diagram illustrating a system of the present invention.
Figure 2:
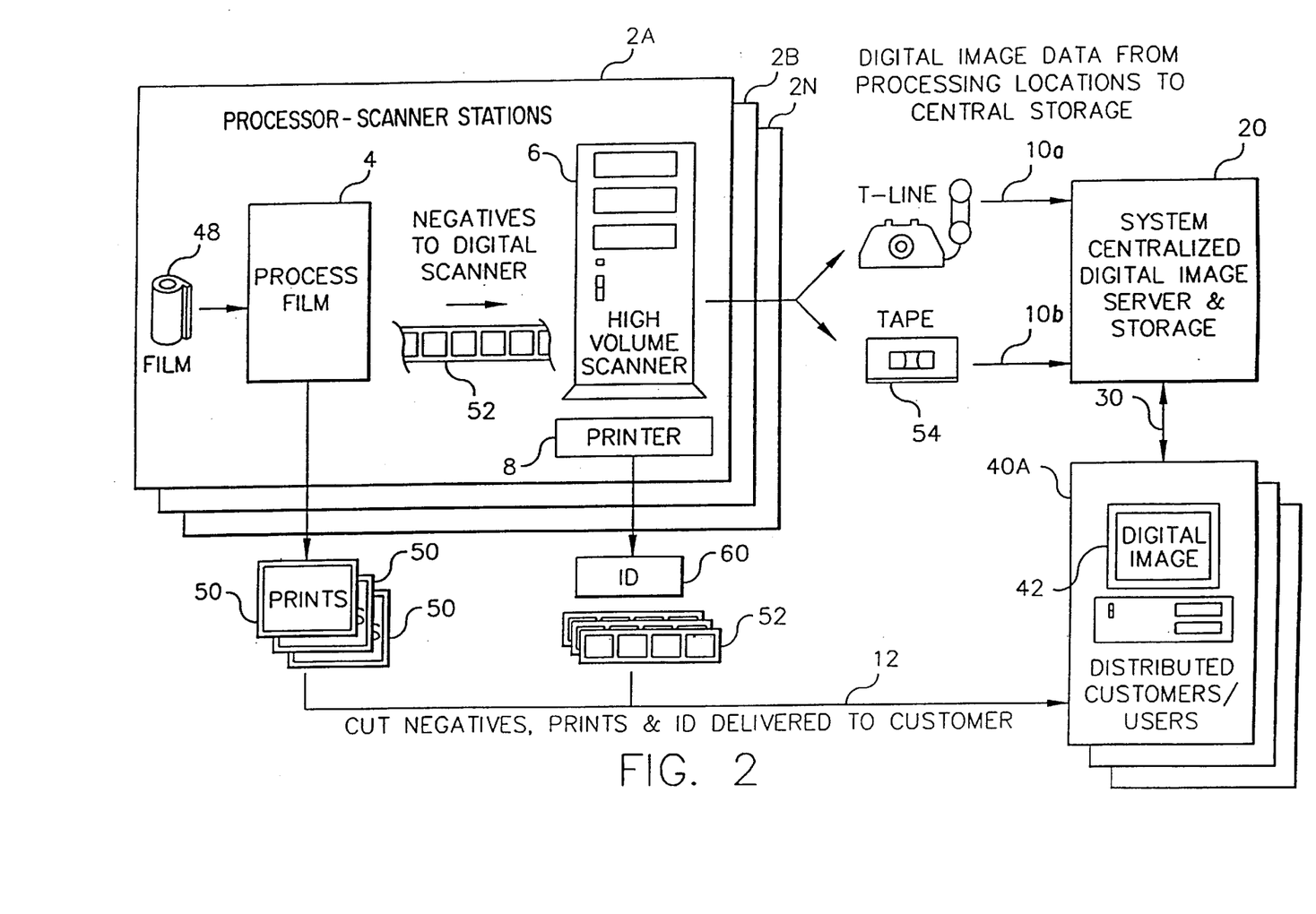
FIG. 2 is a data flow diagram illustrating the operation of some aspects of the system of FIG. 1.

Referring now to the drawings and particularly FIG. 1, the illustrated embodiment of the image handling system of the present invention includes a plurality of processor-scanner stations 2A, 2B, 2C to 2N which are remote from one another, as best seen in FIG. 1. Each processor-scanner station includes a film processor 4 which can process exposed photographic film and produce hardcopy images in the form of both print sets 50 and corresponding negative sets 52 (only one of which is shown in FIG. 2). Negative image set 52 will typically be the developed negative film obtained from exposed film roll 48, while each print set 50 will typically be reflective prints of the negative set 52. However each set 50 and 52 can consist of one or more images.

Each processor-scanner station 2A to 2N further includes a high volume scanner system 6 which includes a suitable scanner for scanning the hardcopy images on each image set 52 to obtain a corresponding digital image set signal. High volume scanner system 6 may be a digital computer in the form of a workstation or desktop computer equipped with a suitable digital scanner for scanning negative set 52. Additionally, each scanner system 6 can assign an associated identification signal to each image set signal so obtained. This assignment may be accomplished by suitable software running on scanner system 6, and is described further below. However, it will be noted at this point that each identification signal is unique in that it includes a scanner location identification which is unique for each processor-scanner station 2A to 2N.

Figure 3:
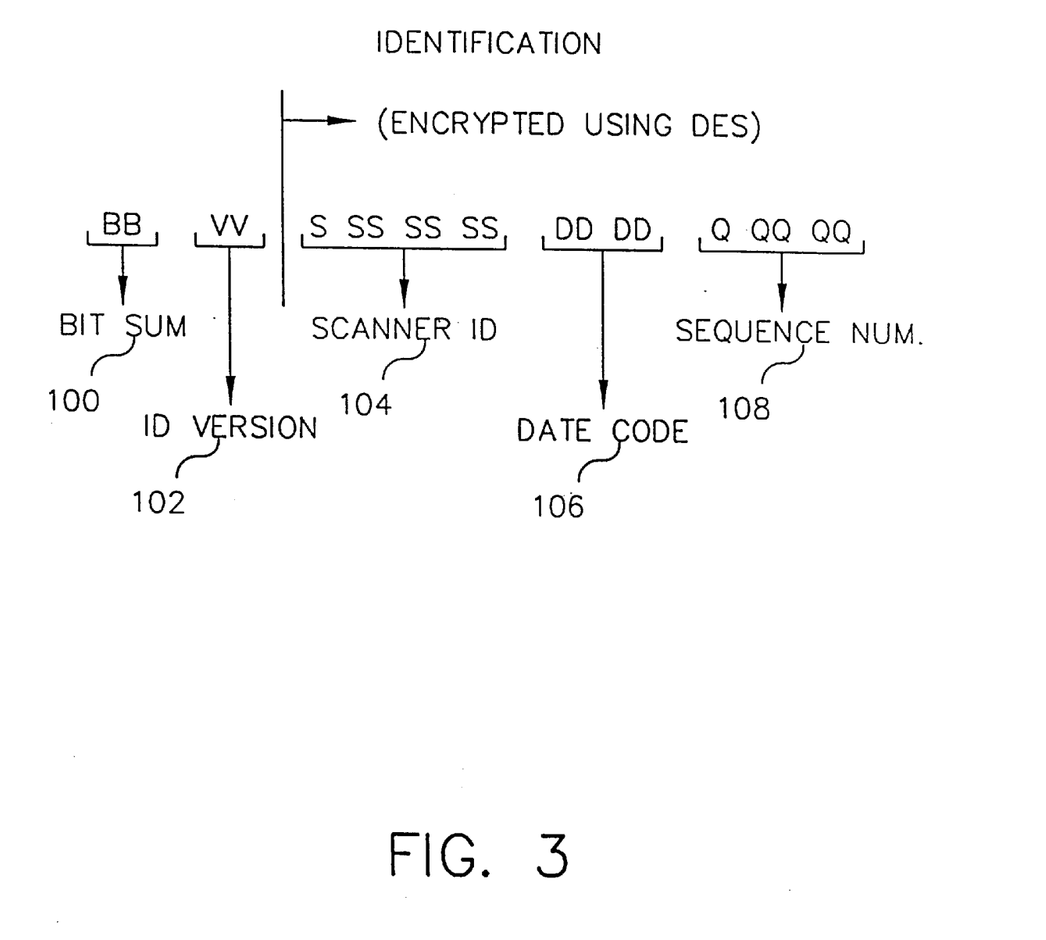
FIG. 3 is a diagram illustrating the components of an identification generated for an associated image set signal.

As to the details of the identification assigned to each associated image set signal, this is shown more fully in FIG. 3. The components of the assigned identification are as follows:

Bit Sum 100: the unsigned sum of the binary identification ("ID") data including ID version, Scanner ID, Date Code and Sequence Number (8 bits binary). The bit sum will be calculated after encryption but prior to conversion to the ASCII representation. The purpose of this Bit Sum is to identify data entry errors without querying the data base of hub station 20 for an associated image set signal.

ID Version 102: revision number of this ID number (8 bits binary). This maps to the encryption key, a new version should accompany any change in the key.

Scanner ID 104, unique identifier for each processor-scanner station 2A to 2N (28 bits binary), which therefore serves as the scanner location identification.

Date Code 106, date a scan of a hardcopy image set began on (16 bits binary—9 bits for day of year and 7 bits for year). Year 0 will be any year in which the system of FIGS. 1 and 2 is first activated.

Sequence Number 108, incremented for each roll scanned within a day (20 bits binary).

The actual ID signal will be created from the binary representation of the Bit Sum 100, ID Version 102, Scanner ID 104, Date Code 106 and Sequence Number 108 as shown below in FIG. 3 (note that the ID Version 102 and Bit Sum 100 must not be encrypted):

The ID, minus the Bit Sum 100 and ID Version 102, will be encrypted prior to conversion to its ASCII form by using DES (Data Encryption Standard) functions with a 56 bit key. DES is described in "Applied Cryptography; Protocols, Algorithms, and Source in C", by Bruce Schneier, 1994, John Wiley & Sons, Inc. The key will be non-obvious and known to the hub station 20 (that is, saved in a storage at hub station 20). The key will be provided to valid scanner sites when the key is changed allowing them to begin producing ID signals encrypted with the new key. This change may be required if an old key has been recognized by someone attempting to claim images which are not theirs. A change to the key will map to a new ID version and this association will be kept at hub station 20. The ID Version 102 facilitates the decryption process by associating the key used to encrypt a given ID Version with a non-encrypted portion of that ID. This will allow the ID to be decrypted and its component parts associated with a roll when it is loaded (that is, saved) by the hub station 20. The ID will result in an audit trail for all digital image sets loaded by the central hub station 20. This audit trail can be used by hub station 20 to respond to end user queries about the status of the digital image sets, as described below.

The ID will be presented to the user (such as by printing a hardcopy) as 16 case insensitive alphanumeric ASCII typeable characters (i.e. 10 byte binary ID represented in base 32 using 0–9 and Aa–Vv where 0=0, 1=1, . . . , Aa=10, . . . , Vv=31).

As can be seen from the above, the non-encrypted ID is incremented for each film roll received at a given scanner station. If nothing further was done to the ID, a malicious user at a remote terminal could simply increment a received ID and thereby access another's digital image set. However, due to the encryption of the ID as described above, the resulting encrypted identifications for a series of different film rolls sequentially scanned at the same location, no longer bear the same sequential relationship as the non-encrypted identifications. In fact, the encrypted indentification for one film roll in such a series cannot be determined from the encrypted identification of another roll, without knowledge of the encryption or decryption algorithm. The presence of the non-encrypted bit sum 100 (sometimes referenced as a "checksum") makes it even more difficult to falsify an ID.

Each processor-scanner station 2A to 2N further includes a first communication means to communicate each image set signal and its associated identification signal to a remote hub station 20, which is part of the image handling system. This communication is illustrated as communication link 10 in FIG. 1. The first communication means may be in the form of a modem (not shown) in scanner system 6, which communicates each image set signal and associated identification over a link in the form of a connection to the hub station 20, such as telephone circuit connection 10a shown in FIG. 2. However, the first communication means could be a modem or communication card which communicates with hub station 20 over a different type of connection, such as a dedicated line connection or a network (such as the Internet). Of course, the various processor-scanner stations 2A to 2N in FIG. 1 may use different first communication means, and therefore the various links 10 shown in FIG. 1 may be the same, or a combination of connections or physical transfer links, one or more of which may be active at any given time (depending upon how many processor-scanner stations are communicating image set signals and associated identifications to hub station 20 at any given time). It will be appreciated that more than one processor-scanner station 2A to 2N may typically be in communication (such as by connection) with hub station 20 at any given time.

Alternatively, as shown in FIG. 2, the first communication means can be in the form of a tape storage in scanner system 6, which stores the digital image signal sets and associated identification signals on a data tape 54 which is physically transferred (as illustrated by physical transfer link 10b in FIG. 2) to hub station 20. In this case the link 10 is a corresponding physical transfer link 10b as shown in FIG. 2. It will be appreciated, of course, that tape 54 could be replaced by any other suitable data storage means, such as optical or magnetic disks.

The scanner system 6 at each processor-scanner station 2A to 2N, further includes a printer 8. Printer 8 is connected to scanner 6 so as to print out a hardcopy series of characters (shown as hardcopy identification 60 in FIG. 2) corresponding to each identification signal.

The single hub station 20 may particularly be a digital computer, such as a workstation, minicomputer or mainframe computer, suitably programmed to execute the steps of the method of the present invention required of hub station 20. Hub station 20 includes a second communication means to receive image set signals and their associated identification signals from each of the processor-scanner stations 2A to 2N. The second communication means may be a modem or suitable communication card (not shown) in the hub station for the case where any of processor-scanner stations 2A to 2N will connect by a link such as the telephone circuit connection 10a of FIG. 2, or may be a reading device (not shown) which can read a storage medium physically conveyed to hub station 20 when such a communication means is used by any of processor-scanner stations 2A to 2N. Of course, hub station 20 may have both such types of second communication means to accommodate the different types of communication means used by different processor-scanner stations 2A to 2N.

Hub station 20 further has a first storage device to store the received image set signals and their associated identification signals. Such storage device may be any suitable writeable magnetic or optical media (such as one or more hard disks or magnetic tape or optical disks or tape). A second storage, which may or may not be the same physical device as the first storage device, contains directory data correlating each scanner location identification with a scanner address (such as a conventional mailing address or e-mail address).

Hub station 20 additionally has a third communication means for communicating stored image set signals to any of a plurality of terminals 40A, 40B, 40C to 40N connected to hub 20. Such connection is illustrated as connections 30 in FIG. 1, and may, for example, be a network connection, dedicated data line connection, or telephone system connection. Preferably, one or more of the connections 30 will be network connections using the Internet. It will be appreciated that the second and third communication means can be the same physical element, such as a suitable communication program operating through a modem card with one or more telephone connections, when at least one of the processor-scanner stations 2A to 2N communicates with hub station 20 using a connection in the same manner as at least one remote terminal 40A to 40N. Each of remote terminals 40A to 40N may also be any digital computer 42 with appropriate communication hardware and software to engage in two-way communication with hub station 20 over connections 30. The presence of such suitable hardware and software will be understood from each of the terminals 40A to 40N being "connected to communicate" with hub station 20. One or more remote terminals 40A may be connected to hub station 20 at any given time.

It will be appreciated that additional means for communicating image signals to hub station 20 can also be provided. For example, such additional means can include a digital camera which communicates a digital image to hub station 20, such as by a transmission over a network or telephone connection, or one or more scanner stations which do not have processors located at the same location.

Methods of the present invention which are executed on the system of FIGS. 1 and 2 will now be described. First, the user will deposit their undeveloped exposed film 48 at any one of the processor-scanner stations 2A to 2N which the user finds most convenient. At the selected processor-scanner station the user requests the type of processing and hardcopy images (for example, just negatives or additionally, reflective prints) desired and requests that an image set signal corresponding to the image set on film 48 be produced. These requests are made by checking appropriate boxes on a film processing envelope into which film 48 will be deposited. Film 48 will be processed (that is, chemically processed to yield a permanent image) to generate a corresponding negative set 52 and a corresponding print set 50. Different negative sets 52 from different corresponding films 48, will be batched together with negative sets from other orders requesting the scanning service and the batch will be scanned using high volume scanner system 6. As described earlier, each scanner system 6 will generate from each negative set 52, a corresponding digital image set signal and will also generate an associated identification signal for each image set signal. The identification signal includes a unique scanner location identification as discussed above, and in more detail below. The image set signal can be in any suitable format that will be acceptable to hub station 20, such as TIFF, JFIF, BMP, PICT, GIF, PhotoCD or particularly the recently announced FlashPix format.

A FlashPix file contains the complete image plus a hierarchy of several lower-resolution copies within the same file. This makes a FlashPix file function like a small file when users want it and like a big file when users need it. The FlashPix file structure employs Microsoft Corporation's OLE structured storage format, which holds image data and related descriptive information in a standardized "wrapper." The FlashPix format also records edits to an image as small scripts called "viewing parameters." Edits are applied to high-resolution images only when necessary—usually when users want high-quality output. The FlashPix format supports two clearly and completely defined color space options—a calibrated RGB color space definition and Photo YCC. The color space options are built directly into the file format. Optional JPEG compression, along with a single-color compression option where appropriate, is also provided. Further details of the FlashPix file format are available from Eastman Kodak Company, Rochester, N.Y.

Each print set 50, corresponding negative set 52, and associated identification, are forwarded to the end user (and hence, forwarded to a remote terminal when the user accesses such a remote terminal) by a route which is independent of hub station 20 (that is, this delivery to the end user does not go through hub station 20). Such independent routes 12 are indicated by lines in FIG. 1. In the case of the identification, this may consist simply of printing the identification associated with a given image set signal (and hence associated with the corresponding image set 52, 50 and film 48) with printer 8 and forwarding that printed identification with the associated hardcopy image sets 50, 52, to the user who deposited the associated film roll 48. This forwarding can simply be handing the print set 50, corresponding negative set 52 and associated printed identification 60 the user, or sending it to the user by some other means, such as conventional mail or courier. Alternatively, other routes independent of hub station 20 can be used as forwarding routes 12. For example, the identification could be communicated to the user by electronic mail, facsimile or some other means.

It is possible that, alternatively or additionally, the identification associated with a given film roll 48 could be communicated to the user through hub station 20, such as by an electronic communication (such as electronic mail through a connection such as the Internet). Such an electronic communication of the identification could simply be the same electronic communication of the identification communicated to hub station 20 along with the associated image set signal. Hub station 20 could then communicate the identification to a corresponding terminal 40A to 40N when the user communicates with (that is, logs onto) hub station 20. Such forwarding routes are indicated as forwarding routes 14. However, such a route is less desirable than routes 12 which are independent of hub station 20. This is because if hub station 20 does not receive the communicated image set signal and associated identification from the processor-scanner station at which the film roll 48 was scanned, the user does not have the identification available to her to use in determining why the associated image set signal is not available at hub station 20.

The digital image signal set corresponding to a customer's film roll 48 and an associated identification signal, can be communicated to hub station 20 by a connection 10*a* or a physical transfer link 10*b* of a signal storage medium such as a magnetic tape 54 as shown in FIG. 2 and discussed above. Hub station 20 receives each digital image set and its associated identification signal communicated from each processor-scanner station 4A to 4N in the first storage means. The identification signal is decrypted and each image set signal can be stored in the first storage and indexed by the decrypted identification.

The user will be able to attempt to access the digital image set corresponding to film roll 48 as soon as they receive the identification, by using any remote terminal, such as remote terminal 40A to connect to and communicate with hub station 20 by a connection 30. At that time, the user simply enters the identification and over the connection successfully completes a user registration process at hub station 20. The identification will allow the user to inquire of hub system 20 as to the location and status of the digital image set signal corresponding to the identification (and film roll 48). Hub station 20 decrypts the identification entered by the user, and can search its index for a saved digital image of predetermined characteristics associated with the decrypted identification entered by the user. By "predetermined characteristics" in this case, is referenced any suitable predetermined characteristics determined by the operator of the system. For example, hub station 20 may be set such that any image set signal received will be stored and indexed with its associated identification signal. Alternatively, the "predetermined characteristics" could be set so that only a complete image set is so stored, or incomplete image sets (such as might result from an interruption of a connection between a processor-scanner station 4A to 4N and hub station 20, or from corrupted data) or digital image sets in a format not accepted by hub 20, may be stored but are identified as not meeting the predetermined characteristics (for example, they are stored with an associated identification indicating incomplete or corrupted data, or a data format not supported by hub station 20).

If such a digital image set of predetermined characteristics exists, one or more of the images in the set may be communicated to the user at remote terminal 40A, or forwarded to another of the connected remote terminals 40B to 40N, as instructed by the user. In the latter case, this would amount to the user forwarding one or more copies of the digital image as desired. The user may then edit or print the images as desired, and may further communicate the edited image back to hub station 20 for storage in addition to or instead of, the original unaltered digital image. Furthermore, hub station 20 could be programmed to transmit to the user at a remote terminal, either upon request or automatically (in the form of advertising), details of services that can be requested from hub station 20. Such services may include various sized prints of an original or edited image stored at hub station 20 (either as prints by themselves, or with accompanying text or graphics, such as embodying the image in a greeting card), or the incorporation of one or more original or edited images onto a product, such as an article of clothing or other useful articles (for example, cups or plates). For this purpose, hub station 20 may communicate (preferably by transmission) the image signal and accompanying instructions, text, and/or graphics, to one or more printers (not shown) or other locations (not shown) at which the user's request may be fulfilled. Such printers or other locations may or may not be remote from hub station 20.

As mentioned digital image data may be lost in transit from a processor-scanner station to hub station 20, an error may occur during the loading of the digital image data to the hub station 20, the image quality may be poor, or some other problem may result in hub station 20 not storing the digital image set associated with the identification entered by the user.

If a digital image set of predetermined characteristics is not stored at hub station 20, different procedures can be used to inquire as to the whereabouts of such digital image set. For example, the date indication of the identification entered by the user can be compared with the current date. If the difference between the date identification of the entered identification and the current date is less than a tolerance predetermined by the user (for example, less than 5 days), hub station 20 may communicate a second message to the user at the remote terminal 40A stating that insufficient time has been allowed for receipt of the scanned image set, and to check again later. Additionally, hub station 20 could indicate to the user upon such an inquiry that an electronic mail message will be sent from hub station 20 to the electronic mail address of terminal 40A within an additional predetermined number of days (for example 10) when a digital image set associated with that identification is received at hub station 20, or by the end of that additional predetermined period if no such digital image set is received. Hub station 20 can then index the additional predetermined date and automatically send the foregoing messages when, or if no, digital image set associated with the identification is received at hub station 20 by the predetermined date.

If the difference between the two dates exceeds the predetermined tolerance, hub station 20 can then determine from the directory database in the second storage, the scanner address associated with the user entered identification. In the particular example above, this would be scanner 2A. Hub station 20 can then forward a first message in the form of an inquiry to the determined scanner address to inquire as to the particulars of the communication of the digital image set associated with that identification, or in the form of a request to repeat the communication if possible (for example, where the determined processor-scanner station has stored a copy of the digital image set). Hub station 20 can connect to the determined processor-scanner station 2A to deliver the first message as, for example, be an electronic mail message or facsimile, if the processor-scanner station has the capacity to receive such a message. In the case of the electronic message in particular, the processor-scanner stations 2A to 2N may optionally be equipped with a storage which stores particulars of when and how each digital image set and associated identification was communicated to hub station 20. In this case, a processor-scanner station to which an inquiry was sent, could access such particulars of digital image set status and disposition in response to the inquiry, and communicate them to hub station 20 through a connection, for communication to a connected terminal 40A to 40N. Alternatively, the first message can be printed at hub station 20 and forwarded by conventional mail or courier to the determined processor-scanner station such as processor-scanner station 2A.

Of course, the sequences in the foregoing paragraph can optionally be executed upon receipt of a user inquiry, without the described comparing of the difference in the two dates.

It will be appreciated from the above, that the end user is able to drop off multiple film rolls at different ones of the processor-scanner stations 2A to 2N and access the corresponding digital image sets, without ever having to keep track of which film rolls were dropped off at which processor-scanner stations, and accesses all scanned image sets at the one hub station 20. Furthermore, the unique scanner location identification aids in tracing a digital image set if for any reason it is not available from hub station 20 by the user.

Figure 4:
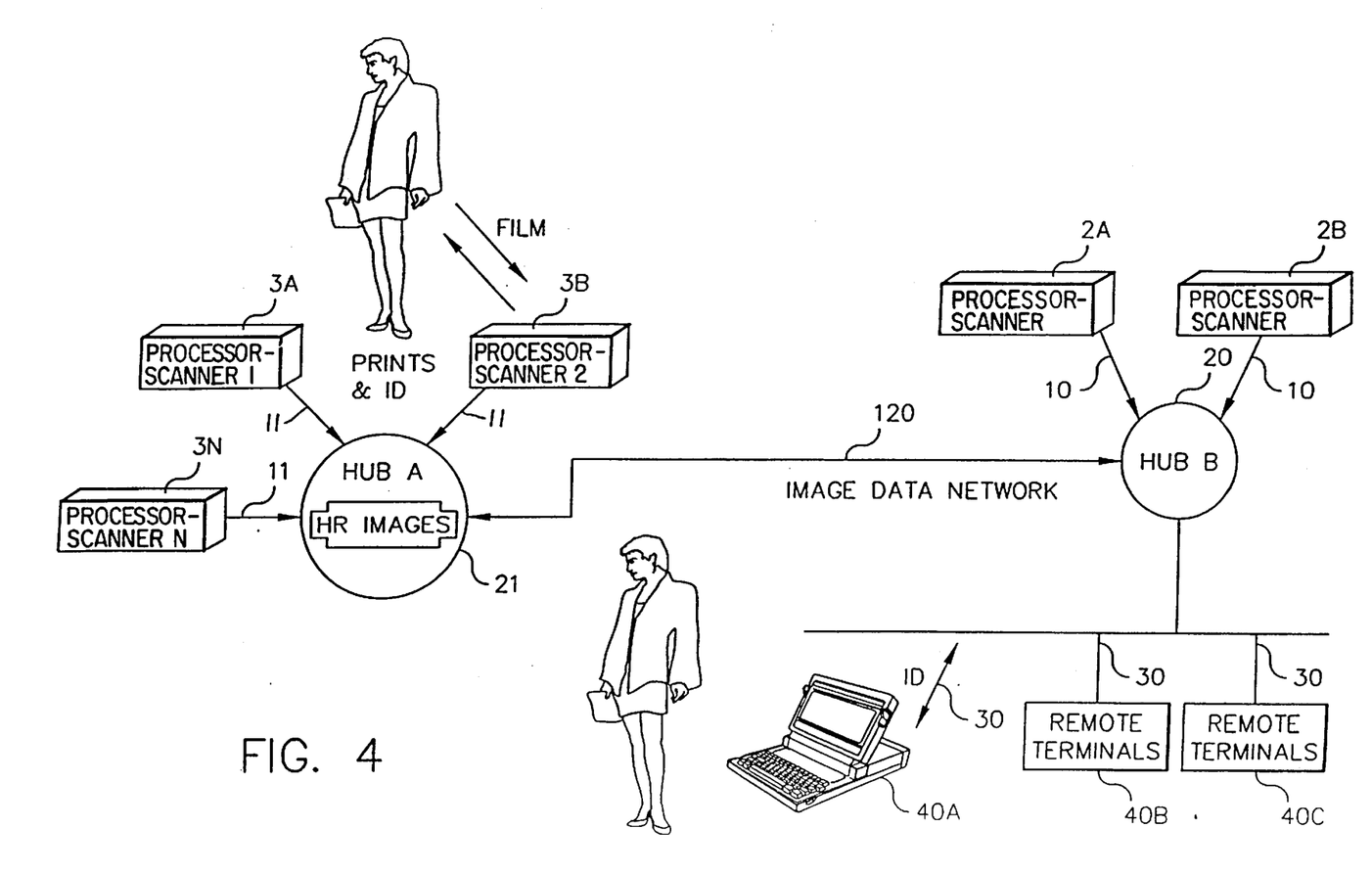
FIG. 4 is a block diagram illustrating a system of FIG. 1 with a further connection of the hub to another hub.

Referring to FIG. 4, there is illustrated the situation where more than one hub is present in the overall system, each hub serving different geographical regions (such as different countries). In FIG. 4, hub station 20 is only shown with processor-scanner stations 2A and 2B communicating therewith, although it will be understood that further processor-scanner stations 2C to 2N can be present. A second hub station 21, which may be the same as hub station 20, is in communication with processor-scanner stations 3A, 3B to 3N over communication links 11, in any of the manners hub station 20 is in communication with processor-scanner stations 2A to 2N, as described above. A plurality of user terminals (not shown) may further be connected to hub station 21. There may, of course, be a further connections of hub station 20 to other hub stations (not shown) each with their own associated processor-scanner stations and terminals (not shown). Hub station 20 may communicate with each over a data network or other connection, such as hub station 20 communicates with hub station 21 over image data network 120. The communication connection from one hub station to hub station 20 can be through one or more other hub stations or not.

In FIG. 4, each of the multiple hub stations, such as hub station 20 and 21, would have directory data in their respective second storages which correlates each scanner location identification with a scanner address and the address of the hub with which that processor-scanner station normally communicates. With this arrangement, a user can drop off a film for processing and scanning at any processor-scanner station which normally communicates with an associated hub, and automatically retrieve digital images at any terminal by communicating at another hub. As particularly shown in FIG. 4, the user drops off a film for processing and scanning at processor-scanner station 3B. The print set and associated unique identification are returned to the user. Processor-scanner station will communicate the digital image set of that film to hub station 21, with which it is normally associated. When the user attempts to retrieve the digital image set from a terminal 40A connected to hub station 20, hub station 20 will compare the decrypted identification transmitted to it by the user with its directory data and ascertains that the film associated with that identification was scanned at processor-scanner station 3B, which processor-scanner station normally communicates with hub station 21. Hub station 20 will then forward a request to hub station 21 (preferably a transmitted request over network 120) for the associated digital image set to be communicated to hub 20. Preferably this communication occurs also as a transmission from hub 21 to hub 20. In this example then, it will be seen that the communication from processor-scanner station 3B to hub station 20, was an indirect communication through hub station 21.

The invention has been described with reference to a preferred embodiment. However, it will be appreciated that variations and modifications can be effected by a person of ordinary skill in the art without departing from the scope of the invention.

| PARTS LIST | |
|---|---|
| 2A, 2B, 2C to 2N | Processor-Scanner Station |
| 3A, 3B to 3N | Processor-Scanner Stations |
| 4 | Film Processor |
| 6 | Scanner System |
| 8 | Printer |
| 10, 11 | Communication Link |
| 10a | Connection |
| 10b | Transfer Link |
| 12, 14 | Routes |
| 20, 21 | Hub Stations |
| 30 | Connections |
| 40A, 40B, 40C to 40N | Terminals |
| 42 | Digital Computer |
| 48 | Film Roll |
| 50 | Print Set |
| 52 | Negative Set |
| 54 | Tape |
| 60 | Identification |
| 100 | Bit Sum |

-continued

| PARTS LIST | |
|---|---|
| 102 | ID Version |
| 104 | Scanner ID |
| 106 | Date Code |
| 108 | Sequence Number |
| 120 | Network |

We claim:
1. An image handling system comprising:
   (a) a plurality of processor-scanner stations remote from one another, each scanner station having at the same location;
   a processor which can process exposed photographic film to produce a hardcopy image set;
   a scanner system which can scan the hardcopy image set to obtain a corresponding image set signal;
   a first communication means for communicating the image set signal to a remote hub station;
   (b) a hub station remote from each of the scanner stations, comprising:
   a second communication means to receive the image set signals from each of the plurality of scanner systems;
   a first storage to store the image set signals;
   a third communication means for transmitting the image set signals to any of a plurality of terminals remote from the hub and each of the processor-scanner stations; and
   (c) a plurality of terminals remote from the hub station and each of the scanner-processor stations, connected to communicate with the hub station;
   wherein, each scanner system also assigns an associated identification signal to each image set signal which comprises a scanner location identification, wherein each scanner location identification is unique;
   the first communication means also communicates each identification signal to the hub station which receives and stores the identification signals;
   a second storage containing directory data correlating each scanner location identification with a scanner address;
   means for determining if an image set signal associated with the identification transmitted from the remote terminal, is stored at the hub station; and
   means for determining from the directory data, the scanner address of a scanner at which an image set signal corresponding to an identification received from a remote terminal, was generated.

2. An image handling system according to claim 1 wherein each processor-scanner station also has a printer connected to the scanner system to print the unique identification associated with each image set signal.

3. An image handling system according to claim 1, additionally comprising an identification communication means for communicating the unique identification associated with each image set signal to a terminal remote from the scanner station and the hub station, by a route independent of the hub station.

4. An image handling system according to claim 1, wherein the hub station additionally comprises means for generating a message to the determined scanner address when an image set signal associated with the identification transmitted from the remote terminal is not stored at the hub station, and forwarding the message to the determined scanner address.

5. An image handling system according to claim 4 wherein the message generating means transmits the message to the determined scanner address.

6. An image handling method comprising:

processing exposed photographic film at each of a plurality of processor-scanner stations, each station having both a scanner and a processor at the same location and the processor-scanner stations being remote from one another, to produce a hardcopy image set at the processor-scanner locations;

scanning each hardcopy image set at the same processor-scanner location at which it was processed, to obtain a corresponding image set signal;

communicating each of the image set signals from the scanner to a hub station remote from each of the processor-scanner stations;

storing the communicated image set signals at the hub station;

transmitting the image set signals to any of a plurality of terminals remote from the hub station and each of the processor-scanner stations;

assigning at each scanner system an associated identification signal to each image set signal, which identification signal comprises a scanner location identification, wherein each scanner location identification is unique;

communicating each identification signal to the hub station;

storing at the hub, the communicated identification signal associated with the stored image set signal;

transmitting an identification from a remote terminal to the hub station;

determining if an image set signal associated with the identification transmitted from the remote terminal, is stored at the hub station; and determining from directory data stored at the hub station, the scanner address of a scanner at which an image set signal corresponding to an identification received from a remote terminal, was generated.

7. A method according to claim 6 additionally comprising forwarding the unique identification associated with each image set signal to a terminal remote from the scanner station and the hub station, by a route independent of the hub station.

8. A method according to claim 6 additionally comprising generating, at the hub station, a message to a determined scanner address when an image set signal associated with an identification transmitted from the remote terminal is not stored at the hub station, and forwarding the message to the determined scanner address.

* * * * *